UNITED STATES PATENT OFFICE.

VALENTIN CONTI, GEORGE DE GEOFROY, AND GEORGES LE GALL DU TERTRE, OF PARIS, FRANCE.

ARTIFICIAL STONE.

SPECIFICATION forming part of Letters Patent No. 705,650, dated July 29, 1902.

Application filed October 22, 1901. Serial No. 79,587. (No specimens.)

*To all whom it may concern:*

Be it known that we, VALENTIN CONTI, a subject of the King of Italy, and GEORGE DE GEOFROY and GEORGES LE GALL DU TERTRE, citizens of the Republic of France, all residing at Paris, France, have invented a new and useful Improvement in Artificial Stone, of which the following is a specification.

Our invention relates more particularly to an artificial stone; but it is equally applicable as a cement, paving material, or general building material. As an artificial stone it may be of the sandstone, granite, or other type and is adapted as a building material for use under water, as in the construction of canals, as also a fireproof packing for building or other purposes.

The invention is also applicable to other and various uses and is produced at a low cost in part from the refuse from sundry industries. The composition in its preferred form possesses great solidity, the setting or solidifying rapidly occurring without the process of baking or the application of heat in any form. The composition is also practically non-destructive under the influence of the elements and may be carved or cut with the same facility as the higher grades of stone, granite, &c.

The invention consists of an agglomerate of several elements substantially in the proportions hereinafter specified, which, however, may be varied in order to obtain the production of substances of differing solidity, color, specific gravity, or other properties or conditions, or to adapt the product or substance to varying resistances.

In carrying out our invention in its preferred form we take the following ingredients or substances in substantially the proportions, by weight, herein specified and mix them together—that is to say, sulfate of aluminium, fifteen parts; pulverized kieselguhr, fifteen parts; calcinated magnesia, fifty parts; chlorid of magnesium, twenty-five parts; sulfate of magnesium, seventy-five parts; inert matter, as broken stone, brick, pumice-stone, asbestos, glass, sand, &c., five hundred parts. The above ingredients or substances having been mixed together, the mass is allowed to stand in order that it may set, as is customary in compositions of this character. The ingredients mixed as above may be formed in blocks or in molds of any desired form and having any required configuration.

The important element of our invention is the sulfate of aluminium, which is used in the form of an alkaline or oxysulfate, it constituting the principal element in our agglomerated mixture. This chemical may be prepared by treating clay that has been calcined (or bauxite) by sulfuric acid at 52° Baumé at a temperature from 80° to 90° centigrade. The chemical reaction having been accomplished and the solution brought to a density of 1.320, we add to the sulfate thus formed an excess of aluminium precipitate, which, partly dissolving, gives the alkaline salt, which may then be obtained by the ordinary methods and dissolved in water for use. The substance formed under the above formula presents the appearance of artificial stone, having its hardness and weight, and is capable of ornamentation or coloring in any desired manner and may be readily carved after hardening. The use of kieselguhr admits of greater ease in mixing and molding and also economy, as it enables us to use a smaller amount of chemicals to a given amount of inert matter.

In order to obtain a substance of lighter weight, as for use in tropical buildings or as a filling for walls, roofs, &c., and for other purposes for which the artificial stone of greater specific gravity above described is not adapted, we use instead of the five hundred parts of inert matter for the heavier specific gravity fifty parts of inert matter—as broken-up cork, asbestos, or other light substance—adapted to the purpose, the formula as above given remaining the same except as to modification in the quantity of inert matter used. The lighter body or composition obtained as a modification of our invention is not designed to be fire and water proof, as is the denser material formed under our preferred formula, which may also be used as a fire or water proof mixture or waterproof cement adapted to withstand the action of either fresh or salt water.

Our invention, more especially in its preferred form, possessing great density and hardness, is capable of receiving a high polish, so as to produce artistic effects. It is also adapted as a plaster finish or stucco for the exterior of buildings, having great durability and capacity to withstand the action of the elements, variety of temperatures, and the like.

Having thus described our invention, we claim—

An artificial stone, cement or similar product, consisting of the following elements combined in substantially the weight proportions named, viz: sulfate of aluminium fifteen parts; pulverized kieselguhr fifteen parts; calcinated magnesia fifty parts; chlorid of magnesium twenty-five parts; sulfate of magnesium seventy-five parts, and inert matter, as described, to give the required density and specific gravity, substantially as set forth.

In witness whereof we hereunto set our hands and seals.

VALENTIN CONTI. [L. S.]
  GEORGE DE GEOFROY. [L. S.]
  GEORGES LE GALL DU TERTRE. [L. S.]

Witnesses to signatures of Valentin Conti and Georges le Gall du Tertre:
  J. ALLISON BOWEN,
  PAUL F. PÂQUET.

Witnesses to signature of George de Geofroy:
  GEORGE H. HOWARD,
  C. B. BULL.